(12) United States Patent
Choate

(10) Patent No.: US 7,191,568 B1
(45) Date of Patent: Mar. 20, 2007

(54) MODULAR SAFETY SURFACE AND METHOD FOR PREPARING THE SAME

(76) Inventor: Nick Choate, 1001 NE. 10th St., Moore, OK (US) 73160

( * ) Notice: Subject to any disclaimer, the term of this patent is extended or adjusted under 35 U.S.C. 154(b) by 293 days.

(21) Appl. No.: 10/354,726

(22) Filed: Jan. 30, 2003

Related U.S. Application Data

(60) Provisional application No. 60/353,965, filed on Jan. 30, 2002.

(51) Int. Cl.
E04F 11/104 (2006.01)

(52) U.S. Cl. .............................. 52/177; 52/181; 52/188; 404/19; 404/20

(58) Field of Classification Search .......... 52/177–181, 52/182, 184, 188, 189, 190, 191; 404/19–21, 404/28, 82; 14/73
See application file for complete search history.

(56) References Cited

U.S. PATENT DOCUMENTS

| | | | |
|---|---|---|---|
| 3,575,780 A | 4/1971 | Trieschmann et al. ...... 161/123 |
| 3,745,034 A | 7/1973 | Smith et al. .................. 117/17 |
| 3,771,893 A * | 11/1973 | Miller ......................... 404/101 |
| 3,785,842 A * | 1/1974 | Murray ........................ 106/457 |
| 4,029,852 A | 6/1977 | Palena ......................... 428/621 |
| 4,243,696 A | 1/1981 | Toth ............................. 427/27 |
| 4,271,555 A * | 6/1981 | Mingolla et al. ............... 14/73 |
| 5,077,137 A | 12/1991 | Molnar ........................ 428/601 |
| 5,356,170 A | 10/1994 | Carpenter et al. ............ 51/293 |
| 5,447,387 A * | 9/1995 | Fagan .......................... 404/20 |
| 5,475,951 A | 12/1995 | Litzow ......................... 52/177 |
| 5,763,070 A | 6/1998 | Kerlek et al. ............... 428/329 |
| 5,919,295 A * | 7/1999 | Lamba et al. ................. 106/36 |
| 6,439,806 B1 * | 8/2002 | Dillingham .................. 404/95 |

* cited by examiner

*Primary Examiner*—Jeanette Chapman
(74) *Attorney, Agent, or Firm*—Tomlinson & O'Connell, PC

(57) ABSTRACT

A modular safety unit having a skid resistant surface for use in a location where it is desirable to add a skid resistant surface for traction comprising a base made of resin, the base having a top side and a bottom side; an aggregate made from calcined bauxite, and wherein the aggregate is attached to the top side of the base; and an adhesive having a top side and a bottom side wherein the top side is attached to the bottom side of the base and wherein the adhesive bottom side may be selectively attached to a location where it is desirable to add traction.

6 Claims, 2 Drawing Sheets

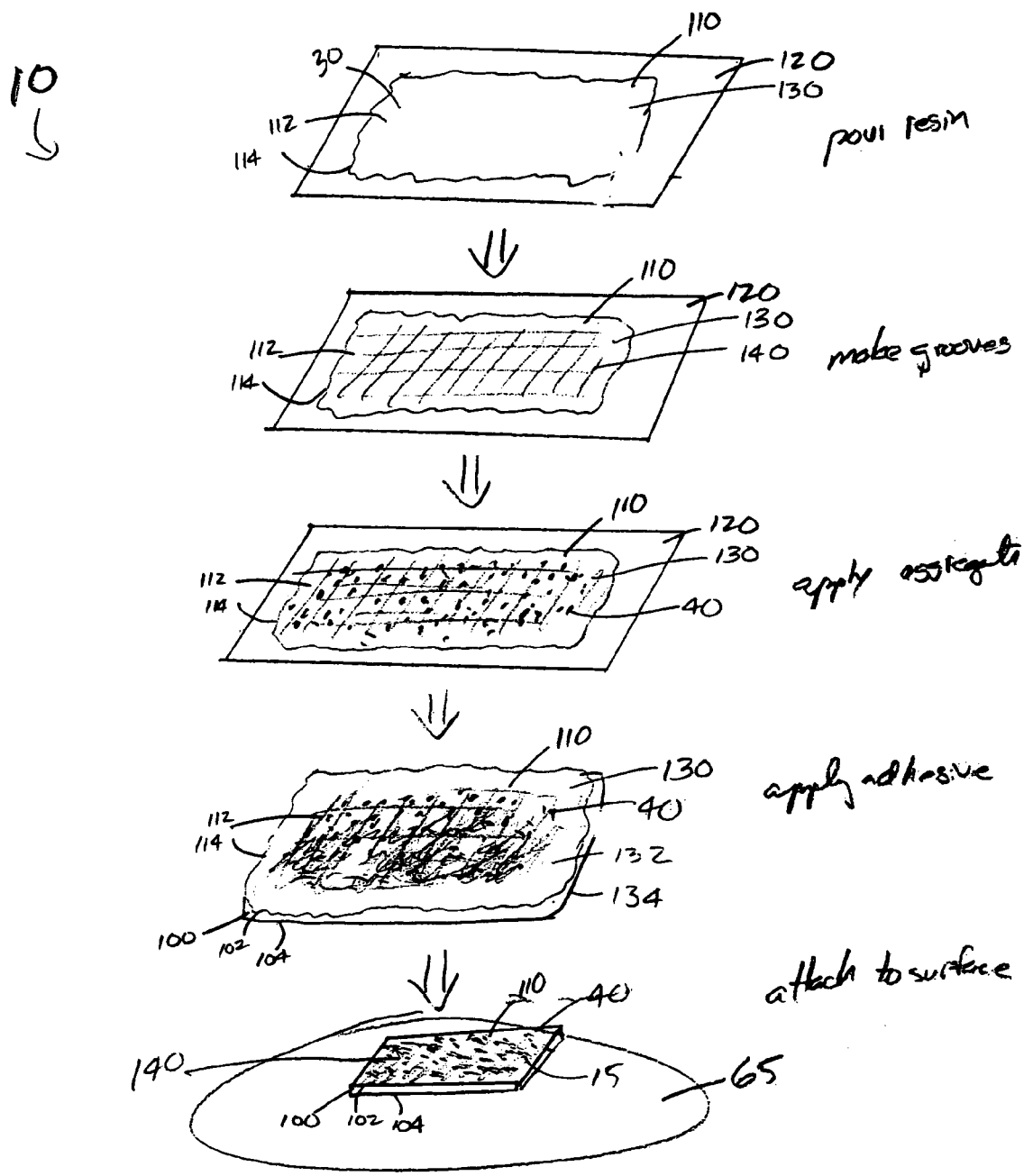

MODULAR SAFETY SURFACE AND METHOD FOR PREPARING THE SAME

CROSS-REFERENCE TO RELATED APPLICATIONS

Priority is claimed from provisional application U.S. Ser. No. 60/353,965 filed on Jan. 30, 2002, and incorporated by reference herein.

BACKGROUND OF THE INVENTION

1. Field of the Invention

In general, the present invention relates to a skid resistant surface and method of making the same. More particularly, the present invention relates to a modular skid resistant surface, which may be applied to steps, floors, ramps and other locations where it is desirable to add a textured surface for traction to these locations, which may have a tendency to become slippery or slick.

2. Description of the Prior Art

One of the leading causes of injury and even death in the United States are accidents caused by slips and falls. As the population continues to age, great monetary resources have to be used in the care of those injured in often preventable accidents that occur where footing is hazardous due to slippery conditions. In the workplace slips, trips and falls make up one of the highest accident statistics recorded every year.

Currently in the prior art, there are many articles of manufacture which can be used to provide enhanced safety to persons walking, climbing, working or otherwise moving around on surfaces that may have a tendency to become slippery through repeated use, through spillage, or because the surfaces are wet or in a damp environment. Catwalks, landings, walkways, workstations, ramps, ladders, entryways to buses and trains, and stairs are just some of the places where there is an increased need for skid resistant surfaces.

Of note, anti-slip products are often categorized for different applications. High profile generally implies an aggressive surface for harsh environments such as offshore installations, heavy industrial use, and vehicle traffic (forklift trucks, etc.). Low profile is also considered an aggressive surface for offshore installations, heavy industrial use, vehicle traffic, high pedestrian use, and general purpose but is of a lesser grade than high profile. Fine profile and extra fine profile are typically for overall general and domestic purpose.

A variety of methods have traditionally been used to produce articles with skid resistant surfaces. The production of such surfaces using electric arc or gas flame spraying is shown in a number of references such as U.S. Pat. No. 4,029,852 and U.S. Pat. No. 5,077,137. The deposition of a metallic powder on a metal strip by electrostatic techniques using a gaseous aerosol is described in U.S. Pat. No. 3,745,034. The use of ground rubber or cork, bonded by polyvinyl chloride, acrylic resins or polyisobutylene is shown and described in U.S. Pat. No. 3,575,780.

U.S. Pat. No. 4,243,696 describes a method for cascading a mixture of powdered resin and particulate material onto the surface of an article followed by heating to soften the resin and adhere to particles to the surface. U.S. Pat. No. 5,256,170 describes a coated abrasive article such as a sanding belt comprising a monolayer of grit particles adhered to a flexible backing using a make-coat layer and a size coat layer, either of which may contain epoxy resins. U.S. Pat. No. 5,475,951 describes a skid resistant surface made by using an epoxy resin to bond a flexible mesh layer and abrasive grit particles to an etched and cleaned ferrometallic substrate.

Each of these articles and processes have certain and known deficiencies. For example, it is known in the prior art that coated surfaces may not have adequate abrasion resistance, whereupon the surface is quickly abraded and the skid resistant characteristics are lost. Furthermore, the substrate and/or layers may be so thick as to present a trip hazard when the product is mounted on stair treads, walkways, and the like. The known art procedures such as grit blasting and/or etching of the substrate surface may be needed to prepare the surface for adequate bonding of the abrasive. Still further, the known prior art surfaces may lack the ability to resist degradation when used in applications where it may be subjected to chemical spills, environments where corrosive or other damaging vapors are present, or where the surface frequently is wet.

Industry is constantly looking for safety products to reduce slip and fall accidents that provide heavy duty, high traction, anti-slip surfaces for stairways, walkways, decks, ladders and ramps. There is a need for an improved skid resistant surface as outlined above. The current invention provides an inexpensive and time saving skid resistant surface and method of preparing the same where the prior art fails.

SUMMARY OF THE INVENTION

In view of the foregoing disadvantages inherent in the known types of skid resistant surfaces and methods to prepare the same now present in the prior art, the present invention provides a modular unit which may be quickly and easily installed in locations where there is a tendency for a surface to become slick or slippery. As such, the general purpose of the present invention, which will be described subsequently in greater detail, is to provide a new and improved modular safety surface and method of preparing the same which has all the advantages of the prior art devices and none of the disadvantages.

To attain this, the present invention essentially comprises a modular unit generally comprising a resin with a skid resistant coating and method for preparing the same that may be adhesively attached to such locations as stairs, ramps and other surfaces where foot traffic may require a skid resistant surface for safety reasons. In general, the invention may be an anti-slip modular surface bonded to a reinforced substrate which may then be secured to existing surfaces using mechanical fixings or adhesives, thus providing a hard-wearing, high traction overlay that resists infilling and moisture to a much greater degree than conventional paints and coatings. It is still further contemplated that the invention may be practiced without the use of a reinforced substrate wherein the resin itself forms the substrate.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved modular safety surface and method for preparing the same which may be easily and efficiently manufactured and marketed.

It is a further object of the present invention to provide a new and improved modular safety surface and method for preparing the same which is of a durable and reliable construction.

An even further object of the present invention is to provide a new and improved modular safety surface and method for preparing the same which is susceptible to a low cost of manufacture with regard to both materials and labor, and which accordingly is then susceptible to low prices of sale to the consuming industry, thereby making such modular safety surface economically available to those in need.

Still another object of the present invention is to provide a new and improved modular safety surface and method for preparing the same which provides all of the advantages of the prior art, while simultaneously overcoming some of the disadvantages normally associated therewith.

Another object of the present invention is to provide a new and improved modular safety surface and method for preparing the same which may be installed quickly and without damaging the surrounding area during installation.

Yet another object of the present invention is to provide a new and improved modular safety surface and method for preparing the same which reduces slips and falls in areas that may be naturally slippery or become slippery when wet.

An even further object of the present invention is to provide a modular safety surface and method for preparing the same, which may be used in outdoor environments and is resistant to exposure from ultraviolet rays and salt, which may be used in icy conditions.

It is a further object of the present invention to provide a new and improved modular safety surface and method for preparing the same, which assures long-lasting high performance that is effective for many years It is still a further object of the present invention to provide a new and improved modular safety surface and method for preparing the same which may be used in hostile working environments where durability and effective high traction properties are needed for a wide variety of external and internal applications.

These, together with other objects of the invention, along with the various features of novelty which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE PICTORIAL ILLUSTRATIONS GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings, drawings, and appendices wherein:

FIG. 2 is a pictorial illustration or drawing of a preferred embodiment of the invention with a method generally depicted.

DETAILED DESCRIPTION OF THE PREFERRED EMBODIMENTS

Figure 1:
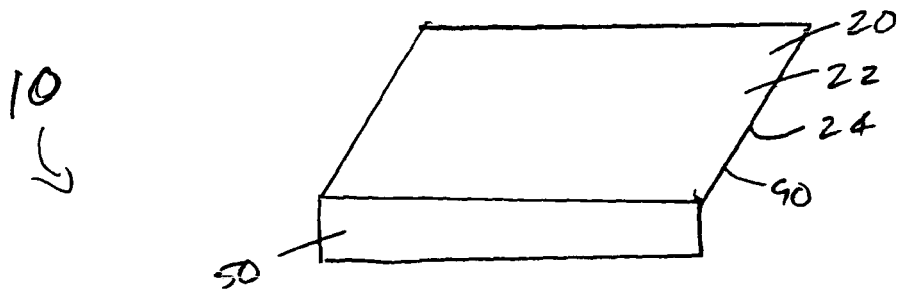
FIG. 1 is a pictorial illustration or drawing of a preferred embodiment of the invention with a method generally depicted.
Figure 1:
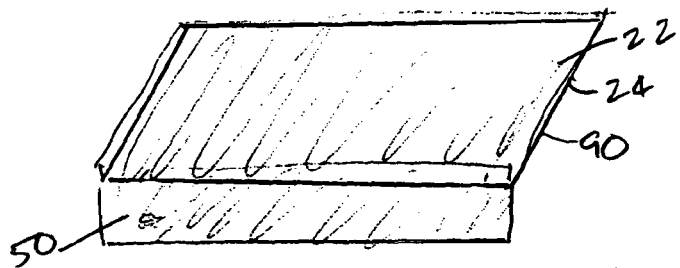
Figure 1:
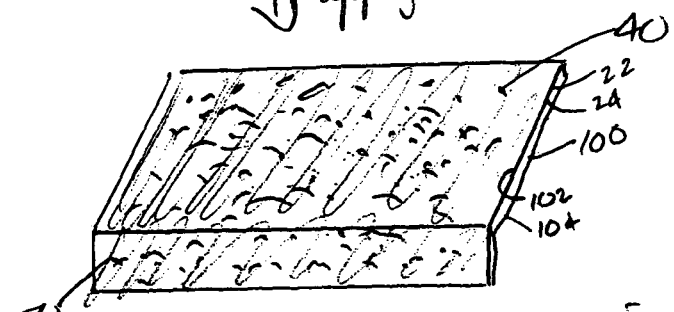
Figure 1:
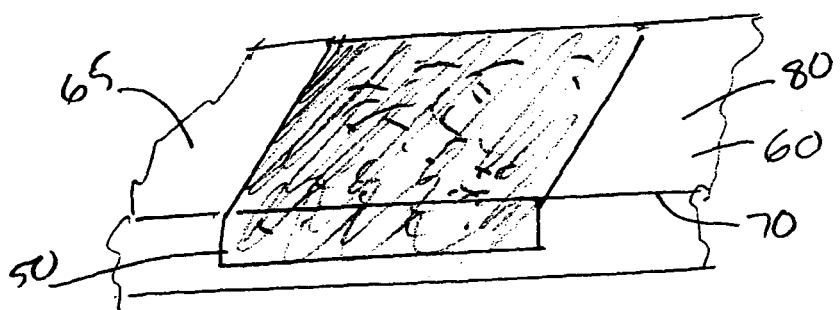

Referring to the illustrations, drawings, and pictures, and to FIG. 1 and FIG. 2 in particular, reference character 10 generally designates a modular safety unit having a skid resistant surface 15 for use in locations where it is desirable to add a textured surface for traction and method of making the same. The invention generally comprises the use of a substrate 20, generally having a top side 22 and a bottom side 24, such as but not limited to plastic, man-made or natural rubber, plexiglass, wood, vinyl, fabric, or other type of material that allows for bonding to a resin 30 which will be discussed in greater detail below. The resin 30 is then generally covered with an abrasive material or aggregate 40 with a preferred embodiment being calcined bauxite aggregate, which is also described, in greater detail below.

In a preferred embodiment, the substrate 20 is molded with a nosing 50 for generally fitting to stairs 60 so that a front corner 70 and a flat portion 80 of the stair 60 is covered by invention 10. In general, a non-treated side 90 (also referred to as bottom side 24) of the substrate 20 is the attached to the stairs 60 or other desired surface 65 with an adhesive 100 which will also be discussed in greater detail below. It is to be noted that invention 10 is not limited to use with stairs 60, but may be further used in a modular or prefabricated form for other surface 65 such as but not limited to floors in general, ramps, ladders, or other areas were it is desirable to have a skid resistant surface 65. It is contemplated that invention 10 may be attached directly to the surface 65 without the need for the substrate 20, which will also be discussed below.

Generally, the substrate 20 may be made from but is not limited to plexiglass or plastic. It is understood other materials may be used such as but not limited to wood, metal, concrete, or other construction materials found in the art.

The invention 10 includes pouring the hardening resin 30 mixture over the substrate 20. As the resin 30 is hardening, adding grooves 140 or other types of indentions (not shown) may be preferred. The abrasive material or aggregate 40 is then placed, attached, fixed or bonded over the resin 30 and spread out for a generally even planar appearance. It is understood that aggregate 40 should generally cover resin 30 entirely such that several layers of aggregate 40 are embedded. In a preferred embodiment, resin 30 is generally not visible after aggregate 40 is applied, attached, fixed or bonded to resin 30.

The final product is then used in conjunction with surface 65 such as stairs 60 and the adhesive 100. Adhesive 100, generally having a top side 102 and a bottom side 104, may be such items as double sided tape, glues, or other such items. In a preferred embodiment, the product sold under the trademark 3M SCOTCH WELD LAMINATING ADHESIVE may be used where the substance is a double sided adhesive. Another preferred adhesive 100 may be double coated cloth scrim tape (DC4623 lbg; 1337 Orfrol). Generally, top side 102 of adhesive 100 is attached, fixed, or bonded to bottom side 24 of substrate 20. Furthermore, bottom side 104 of adhesive 100 is selectively attached, fixed or bonded to the desired surface 65.

The abrasive material or aggregate 40, in a preferred embodiment, is a bauxite that has been colored through pressurizing. The abrasive material or aggregate 40 should have a high friction and color for demarcation such as the product sold under the trademark COLD GRIP manufactured by Adbruf. A preferred color for demarcation might be fluorescent, such as red, yellow, or even blue. In another preferred embodiment, natural stone colors may be used to blend naturally with the surface that the material is being used upon. Furthermore, in another preferred embodiment, high friction material may not necessarily be used. It is contemplated that resin 30 and an abrasive material or aggregate 40 may be of the same color such that the resin 30 and abrasive material or aggregate 40 have a uniform visual appearance. Still further, resin 30 may be of a clear nature.

A smaller granule may be used for lower friction. In a preferred embodiment, RASC guyanan bauxite is used with an AAV of 2.8 and a PSV of 75, and a code number of GY, sold under the trademark SIGHT GRIP.

In a preferred embodiment, resin 30 may consist of the components of a hardener (PACK B) and a base (PACK A) such as sold under the trademark ADBRUF ROAD SAFETY MATERIALS is used. It is understood other material may be used such as but not limited to plastic that may be heated for attaching, fixing, or bonding aggregate 40 thereto. Resin 30 will also be discussed in greater detail below.

It is known to clean and even use a primer on the surface which contacts the resin 30. Surfaces should be sound and dry, free from oil, grease, dust, dirt laitance, curing membranes, and the like. Furthermore, both components as discussed above should be mixed until generally homogenous with a preferred time of 2 to 3 minutes. Generally in a preferred embodiment, the mixture is then poured onto the top side 22 of substrate 20 in rows and squeegeed out, using a serrated squeegee.

The aggregate 40 is then broadcast onto the top side 22 of substrate 20 ensuring that any resin 30 showing has additional aggregate 40 applied. Rough or deeply textured substrates 20 will require additional spreading using a lamb's wool roller or other conventional spreading tools. It is also a preferred embodiment to remove the excess chippings or aggregate 40 after a minimum of 60 minutes has elapsed. Generally, the initial set time may be 1 hour at 20° C. with a hard set in 2 hours at 20° C.

In another preferred embodiment, substrate 20 is not used and resin 30 essentially forms a base 110, generally having a top side 112 and a bottom side 114. Aggregate 40 is then applied, attached, fixed or bonded to top side 112 of resin 30 base 110. Adhesive 100 is generally applied, attached, fixed or bonded to bottom side 114 of resin 30 base 110.

A preferred method of forming resin 30 base 110 is generally pouring the resin 30 on a generally flat preparation surface 120 that will not bond, attach or affix with the resin 30 as the resin 30 is curing into a sheet 130. Such preparation surface 120 may be but is not limited to metal, plastic, polyurethane or other non stick material. Generally, after the resin 30 base 110 has formed but before fully hardening, grooves 140 may be added such as but not limited to ³⁄₁₆ of an inch or ⁵⁄₃₂ of an inch in depth to the top side 112. It is understood that grooving may allow the aggregate 40 to better attach, fix, or bond better with top side 112. It is also understood grooving may not be an included step.

Aggregate 40 may then be added such that aggregate 40 is generally embedded, attached, affixed or bonded into resin 30 base 110 top side 112. After resin 30 base 110 cures or hardens, the resin 30 base 110 is removed from preparation surface 120 such that loose, non-bonded, non-attached or affixed aggregate 40 is removed.

In a preferred embodiment, bottom side 114 is then generally cleaned or prepared for attaching, fixing or bonding adhesive 100. As such, adhesive top side 102 is generally permanently attached, fixed or bonded to bottom side 114 of resin 30 base 110. This may be by removing one side of a double sided adhesive 100 protective layer (not depicted) and joining, attaching, fixing, or bonding the exposed adhesive 100 top side 102 to bottom side 112 of resin 30 base 110.

The finished sheet 130, generally having a top side 132 and a bottom side 134, may now be cut into desired skid resistant modular units 140 such as but not limited to strips 4 inches by 12 inches. In preferred embodiment, modular units 140 may now be selectively applied to desired surface 65 by removing the remaining protective layer (not depicted) on the bottom side 104 of a double sided adhesive 100.

In a preferred embodiment, aggregate 40 is calcined bauxite with preferred properties are as follows:

HARDNESS: The value of 9 on the Moh scale is considered to be an average value.

MOISTURE ABSORPTION: Nil.

MECHANICAL STRENGTH: A typical aggregate impact value is 33.

SPECIFIC GRAVITY: 3.60–3.75 (according to particle size).

| Acid and alkali resistance properties of calcinated bauxite (0.5 mm down) | | | | | |
|---|---|---|---|---|---|
| | CONCENTRATION | | | | |
| REAGENT* | 10% | 40% | 60% | Conc | REMARKS |
| $H_2SO_4$ | | no attack | | | |
| HCl | no attack | slight | Slight | slight | HCl removes $FE_2O_3$ |
| NaOH | | no noticeable attack | | | |

*Calcined bauxite was left for 24 hours at 25° C. in contact with these solutions.

It is noteworthy that fused caustic soda (at about 320° C.) fails to completely break down the calcined bauxite aggregate. In a laboratory, it is usual to employ a molten mixture of sodium carbonate and borax whenever a complete solution of the calcined bauxite is required. As an attacking agent hydrofluoric acid will remove only that small portion of silica which exists in the material, leaving behind a substantial network of alumina.

As a demonstration of the chemical resistance of calcined bauxite aggregates, it is often used in the coating of hot concentrated brine tanks. In normal use the tanks, usually of stainless steel, lasted a few days, whereas when coated with calcined bauxite filled epoxy systems their life increased five-fold.

Calcined bauxite aggregates are extremely resistant to chemical attack. During preparation, the bauxite may be heated in a furnace where temperatures of 1550° C. are reached and these high temperatures impart a remarkable degree of inertness to chemical reaction. It is understood that the calcined bauxite may be formed at lower or higher temperatures. In a preferred embodiment, this type of aggregate 40 has very good resistance to abrasion and is generally hard-wearing and not easily polished by traffic. Average values for the Aggregate Abrasion Value (AAV) lie in the range of 2–4.

Calcined bauxite aggregate which has been used as a road dressing has been found to have a Polished Stone Value (PSV) as high as 83, but the more usual value is about 75. Normal road aggregates such as limestone, calcined flint, quartzite, granite and silica sand have coefficients, which form a surprisingly narrow group with values ranging between 45 and 58. In this respect, therefore, calcined bauxite is outstandingly good at the high values in the region of 70–75, which level it reaches consistently.

In a preferred embodiment, resin 30 is a cold applied, flexible, two part, solvent-free polyurethane (MDI) system that reacts forming carbon dioxide and polyurea. In a preferred embodiment, resin 30 is chosen for use in conjunction with high performance aggregates 40 where non-slip/anti-skid surfaces 65 are specified or required generally having the following characteristics:

| | |
|---|---|
| Specific Gravity (kg/L)(tones/m$^3$) | 1.49 ± 0.05 |
| Pot Life @ 20° C. (approx mins) | 30 |
| Tensile Strength @ 23° C. (N/mm$^3$min) | 10.5 |
| Elongation at Break @ 23° C. (1 min) | 60 |
| Adhesion to Road Surface (N/mm$^2$)(typically) | 19 |
| Shore Hardness D (Din 5350)(approx) | 50 |
| Skid Resistance (SRT - EN 1436) | >80 |
| (typical value using traffic grade aggregate) | |
| Physical state | Liquid |
| Form/color | Brown |
| Odor | Earthy, musty |
| Flashpoint | 275° C. |
| Decomposition temperature | 260° C. |
| Specific gravity | 1.22 g/cm$^3$ |
| Ignition Temperature | >400° C. |
| Vapor pressure | <0.00001 mbar at 20° C. |
| Solubility (water) | Insoluble |

Changes may be made in the combinations, operations, and arrangements of the various parts and elements described herein without departing from the spirit and scope of the invention.

I claim:

1. A modular safety unit having a skid resistant surface for use in a location where it is desirable to add a skid resistant surface for traction comprising:
    a) a base made of resin, said base having a top side and a bottom side;
    b) aggregate made from calcined bauxite wherein said aggregate is attached to said top side of said base; and
    c) an adhesive having a top side and a bottom side wherein said top side is attached to said bottom side of said base and wherein said adhesive bottom side may be selectively attached to said location where it is desirable to add traction, and wherein said location is not a substrate.

2. The modular safety unit according to claim 1 wherein said calcined bauxite has been colored through pressurizing.

3. The modular safety unit of claim 2 wherein said resin is polyurethane.

4. The modular safety unit of claim 3 wherein said polyurethane is cold mixed.

5. A modular safety unit having a skid resistant surface for use in a location where it is desirable to add a skid resistant surface for traction comprising:
    a) aggregate made from calcined bauxite;
    b) a base made from resin having a top side and a bottom side wherein said aggregate is attached to said top side of said base;
    c) a substrate having a nosing for use with stairs, a top side and a bottom side wherein said top side is attached to said bottom side of said base wherein said substrate reinforces said base; and
    d) an adhesive having a top side and a bottom side wherein said top side is attached to said bottom side of said substrate and wherein said adhesive bottom side may be selectively attached to said location where it is desirable to add traction.

6. The modular safety unit according to claim 5 wherein said substrate is plastic.

* * * * *